United States Patent
Nagasawa et al.

(10) Patent No.: US 10,451,926 B2
(45) Date of Patent: Oct. 22, 2019

(54) DISPLAY DEVICE

(71) Applicant: Japan Display Inc., Tokyo (JP)

(72) Inventors: Junko Nagasawa, Tokyo (JP); Hideki Shiina, Tokyo (JP)

(73) Assignee: Japan Display Inc., Tokyo (JP)

( * ) Notice: Subject to any disclaimer, the term of this patent is extended or adjusted under 35 U.S.C. 154(b) by 7 days.

(21) Appl. No.: 15/412,514

(22) Filed: Jan. 23, 2017

(65) Prior Publication Data

US 2017/0227804 A1    Aug. 10, 2017

(30) Foreign Application Priority Data

Feb. 5, 2016    (JP) .................................. 2016-020679

(51) Int. Cl.
| | | |
|---|---|---|
| *G02F 1/1339* | (2006.01) | |
| *G02F 1/1333* | (2006.01) | |
| *G02F 1/1341* | (2006.01) | |
| *G02F 1/1368* | (2006.01) | |
| *G02F 1/1343* | (2006.01) | |

(52) U.S. Cl.
CPC ........ *G02F 1/13394* (2013.01); *G02F 1/1339* (2013.01); *G02F 1/1341* (2013.01); *G02F 1/1368* (2013.01); *G02F 1/133345* (2013.01); *G02F 1/134363* (2013.01); *G02F 2001/13396* (2013.01); *G02F 2001/13398* (2013.01); *G02F 2001/13415* (2013.01); *G02F 2201/56* (2013.01)

(58) Field of Classification Search
CPC ............... G02F 1/13341; G02F 1/1339; G02F 1/13394; G02F 2001/133388
See application file for complete search history.

(56) References Cited

U.S. PATENT DOCUMENTS

| | | | | |
|---|---|---|---|---|
| 2002/0063839 A1* | 5/2002 | Matsumoto | ........... | G02F 1/1339 349/156 |
| 2004/0223093 A1* | 11/2004 | Nakayoshi | ............ | G02F 1/1333 349/58 |
| 2014/0009730 A1* | 1/2014 | Shim | .................... | G02F 1/13394 349/110 |
| 2015/0002794 A1* | 1/2015 | Liu | ................... | G02F 1/134309 349/106 |
| 2016/0202515 A1* | 7/2016 | Watanabe | ............. | G02F 1/1339 349/153 |

FOREIGN PATENT DOCUMENTS

JP        2006-305672 A        11/2006

* cited by examiner

*Primary Examiner* — Paisley L Arendt
*Assistant Examiner* — Mariam Qureshi
(74) *Attorney, Agent, or Firm* — Michael Best & Friedrich LLP

(57) ABSTRACT

A liquid crystal display device includes a first substrate, a second substrate, a liquid crystal sandwiched between the substrates, and a display region. A hole portion is formed in the display region. A first seal portion is formed to surround the display region. A second seal portion is formed to surround the hole portion. The first and the second seal portions seal the liquid crystal. The second seal portion has a first end portion on the liquid crystal side and a second end portion on the opposite side of the liquid crystal side. A sealing material is present in the first end portion. A sealing material is present in the second end portion. A wall-like spacer is formed between the first and the second end portions to surround the hole portion. The wall-like spacer defines the gap between the first and the second substrates.

15 Claims, 10 Drawing Sheets

DISPLAY DEVICE

CLAIM OF PRIORITY

The present application claims priority from Japanese Patent Application No. 2016-020679 filed on Feb. 5, 2016, the content of which is hereby incorporated by reference into this application.

BACKGROUND OF THE INVENTION

(1) Field of the Invention

The present invention relates to a display device having a region surrounded by a display region.

(2) Description of the Related Art

A liquid crystal display device includes a thin film transistor (TFT) substrate and a counter substrate disposed opposite to the TFT substrate. The TFT substrate includes pixels each having a pixel electrode, a TFT, and other elements in a matrix configuration. The TFT substrate is attached to the counter substrate with a sealing material formed on the edge portions of the substrates. On the inner side of the sealing material, a liquid crystal is sandwiched between the TFT substrate and the counter substrate. Images are formed by controlling the light transmittance of liquid crystal molecules in each pixel.

In thin, flat display devices, such as liquid crystal display devices, there is a demand that a space (a hole) penetrated through a region surrounded by a display region is provided and the hole is used for fixing the display region or for providing another member. In other words, for convenience of the manufacturing process steps of the liquid crystal display device, it is efficient to form holes on the TFT substrate and the counter substrate at the same time.

In the display, as techniques of forming holes on a glass substrate, there is a technique in which a hole is formed on one of the glass substrates configuring a plasma display device and the hole is used as an exhaust hole or an inlet hole for a gas, such as Ne and Xe. Japanese Unexamined Patent Application Publication No. 2006-305672 describes a technique of forming an exhaust hole on one of the glass substrates of a plasma display device using a drill having diamond abrasive grains.

SUMMARY OF THE INVENTION

A space (in the following, also referred to as a hole) surrounded by the display region of a screen is formed after the completion of a liquid crystal display panel. In other words, a sealing material is formed on a portion corresponding to the outer shape of the hole, and holes are opened on a counter substrate and a TFT substrate at the same time using a glasscutter, a glass drill, or other devices. In order to open the holes on the counter substrate and the TFT substrate at the same time, it is desirable to form a sealing material on at least a portion from which glass is cut.

On the other hand, since it is inefficient to form liquid crystal display panels one by one, a large number of liquid crystal display panels are formed on a mother substrate, and the mother substrate is separated into individual liquid crystal display panels by scribing. Scribing is a method in which portions corresponding to the outer shapes of the liquid crystal display panels are scribed and an impact is applied to the scribed portions to cut glass. Therefore, no sealing material is preferably present on the scribed portions.

In other words, a seal portion that defines the outer shape of the liquid crystal display panel has a seal structure different from the seal structure of a seal portion formed on the hole portion on the liquid crystal display panel. For example, in the liquid crystal display panel, after a liquid crystal is dropped onto the display region, a mother counter substrate is attached to a mother TFT substrate in a reduced pressure, and then the mother substrates are returned in the atmosphere. The reason why the pressure is reduced is that no bubbles to be contained when the liquid crystal is sealed.

After the mother substrates (a plurality of liquid crystal display panels) are returned from the reduced pressure to the atmosphere, the substrates are deformed. However, degrees of deformation are different among the outer seal portion, the display region, and the hole seal portion. Specifically, in the hole seal portion, a problem arises in that the liquid crystal is entered between the seal portion and the substrates. The present invention is to cope with this problem.

The present invention is to solve the problem. Main specific schemes are as below. In other words, an aspect of the present invention is a liquid crystal display device including: a first substrate; a second substrate; and a liquid crystal sandwiched between the first and the second substrates. In the liquid crystal display device, on the first substrate and on the second substrate, a hole portion is formed. On the first substrate and on the second substrate, a first seal portion is formed on an outer side of a display region. Between the hole portion and the display region, a second seal portion is formed. The second seal portion has a first end portion on the liquid crystal side and a second end portion on the hole portion side. A sealing material is present on the second end portion. Between the first end portion and the second end portion, a spacer is formed so as to surround the hole portion, and the spacer defines a gap between the first and the second substrates.

DETAILED DESCRIPTION OF THE PREFERRED EMBODIMENTS

Figure 1:
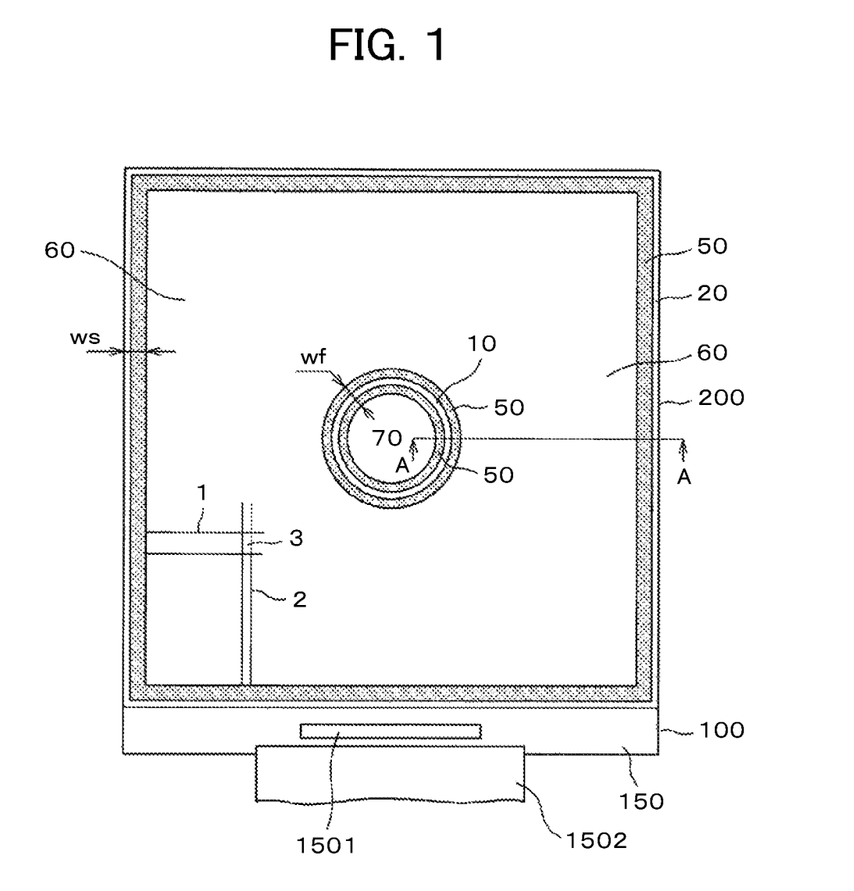
FIG. 1 is a plan view of a liquid crystal display device according to an embodiment of the present invention.

FIG. 1 is a plan view of a liquid crystal display panel to which an embodiment of the present invention is applied. In FIG. 1, a TFT substrate 100 is attached to a counter substrate 200 with a sealing material 50, and a liquid crystal is sandwiched between the TFT substrate 100 and the counter substrate 200. The TFT substrate 100 is formed great than the counter substrate 200. A portion where only the TFT substrate 100 is provided is a terminal portion 150. On the terminal portion 150, a driver IC 1501 that drives a liquid crystal display panel is mounted, and a flexible circuit board 1502 that supplies power, picture signals, scanning signals, and the like is connected to the liquid crystal display panel.

In FIG. 1, in the display region 60, scanning lines 1 extend in a first direction, and are arrayed in a second direction. Picture signal lines 2 extend in the second direction, and are arrayed in the first direction. A region surrounded by the scanning lines 1 and the picture signal lines 2 is a pixel 3. The TFT substrate 100 is attached to the counter substrate 200 with a sealing material 50 of a first seal portion surrounding the display region 60 on the edge portions of the liquid crystal display panel and with a sealing material 50 of a second seal portion surrounding a hole portion 70 in the center. Both of a width ws of the first seal portion and a width wf of the second seal portion are about 0.8 mm.

The configurations of the first and the second seal portions are different. In the first seal portion, on the outermost part of the counter substrate 200, a bank-like spacer 20 is formed, and on the inner side of the bank-like spacer 20, the sealing material 50 is formed. The reason why the bank-like spacer 20 is formed on the outermost part is that in separating liquid crystal display panels out of a mother substrate by scribing, the sealing material on scribed regions is to be excluded.

On the other hand, in the second seal portion around the hole portion on the liquid crystal display panel 70, the sealing material 50 is formed up to the end portion, a wall-like spacer 10 is formed in a circular shape in the inside of the sealing material 50 so as to surround the hole portion. The configuration of the second seal portion is a feature of the embodiment of the present invention.

Figure 2:
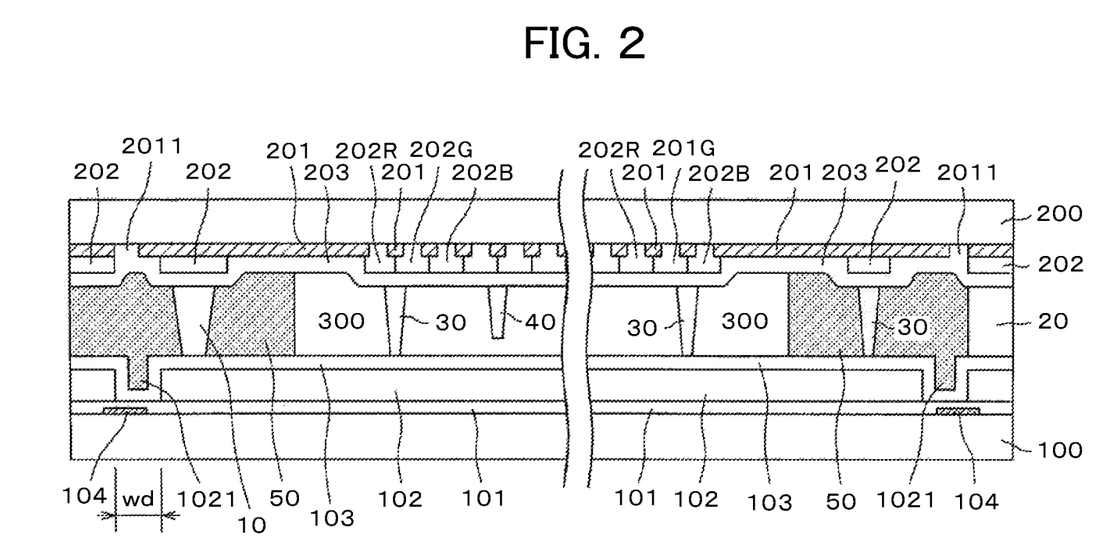
FIG. 2 is a cross-sectional view taken along line A-A in FIG. 1.

FIG. 2 is a cross-sectional view taken along line A-A in FIG. 1. On the left side of FIG. 2, the second seal portion that is the hole seal portion is shown. On the right side of FIG. 2, the first seal portion located on the end portion of the display region. Components on the second seal portion side in FIG. 2 will be described. In FIG. 2, on the TFT substrate 100, a wiring layer 101, an organic passivation film 102, and an upper layer structure 103 are formed. A groove 1021 is formed on the organic passivation film 102 at the seal portion, and the organic passivation film 102 is discontinued. The groove 1021 is formed for preventing moisture from being externally entered to the display region through the organic passivation film 102. Note that, in the embodiment of the present invention, the groove 1021 of the organic passivation film 102 can be used for adjusting the width of the sealing material 50.

On the counter substrate 200, a black matrix 201, a color filter 202, an overcoat film 203, the wall-like spacer 10 that defines the gap between the TFT substrate 100 and the counter substrate 200 in the seal portion, a columnar spacer (a main spacer) 30 that defines the gap between the TFT substrate 100 and the counter substrate 200 in the display region, a sub-spacer 40, and other components. The black matrix 201 in the seal portion has a function as a light shielding film. A groove 2011 is formed on the black matrix 201 in the seal portion. The groove 2011 blocks moisture externally entered along the black matrix 201. In order not to leak light from the groove 2011 on the black matrix 201, a metal light shielding film 104 is formed at corresponding locations on the TFT substrate 100 side.

In FIG. 2, the TFT substrate 100 is attached to the counter substrate 200 with the sealing material 50. The hole seal portion is characterized in that the sealing material 50 is formed up to the end portion. This configuration is provided for allowing the TFT substrate 100 and the counter substrate 200 to be processed at the same time in removing the hole portions using a drill with abrasive grains, for example, after the liquid crystal display panel is formed. In the inside of the sealing material 50, the wall-like spacer 10 is formed to define the gap between the TFT substrate 100 and the counter substrate 200. Forming the wall-like spacer 10 in the inside of the hole seal portion is a feature of the embodiment of the present invention. As illustrated in FIG. 1, the wall-like spacer 10 is formed around with no break.

In the hole seal portion, the sealing material contacts the liquid crystal. On the counter substrate 200 side of the display region, the black matrix 201 is formed. On the holes of the black matrix 201, a red filter 202R, a green filter 202G, and a blue filter 202B are disposed. The overcoat film 203 is formed covering the black matrix 201 and the color filter 202.

In the display region, the columnar spacer 30 is formed on the overcoat film 203 to define the gap between the counter substrate 200 and the TFT substrate 100. The sub-spacer 40 has a function that prevents the gap between the TFT substrate 100 and the counter substrate 200 from being excessively small when a pressure is externally applied to the counter substrate 200 by a finger, for example, and a function that accelerates the velocity of returning the gap to the original state.

The right side of FIG. 2 is a cross-sectional view of the first seal portion formed on the edge portion of the liquid crystal display panel. The configurations of the TFT substrate 100 and the counter substrate 200 are similar to ones described on the left side of FIG. 2. On the end portion on the right side of FIG. 2, the bank-like spacer 20 is formed on the overcoat film 203 on the counter substrate 200. The bank-like spacer 20 is provided for easily separating the liquid crystal display panels in separating the liquid crystal display panels out of the mother substrate by applying an impact after scribed. As illustrated in FIG. 1, the bank-like spacer 20 is formed around the display region with no break.

On the right side of FIG. 2, in the inside of the sealing material 50 of the first seal portion, a columnar spacer 30 is formed. The columnar spacer 30 is the same as the columnar spacer 30 in the display region. The configuration of the display region is the same on the right side and the left side of FIG. 2. The configuration of the seal portion is different between the first and the second seal portions.

Figure 3:
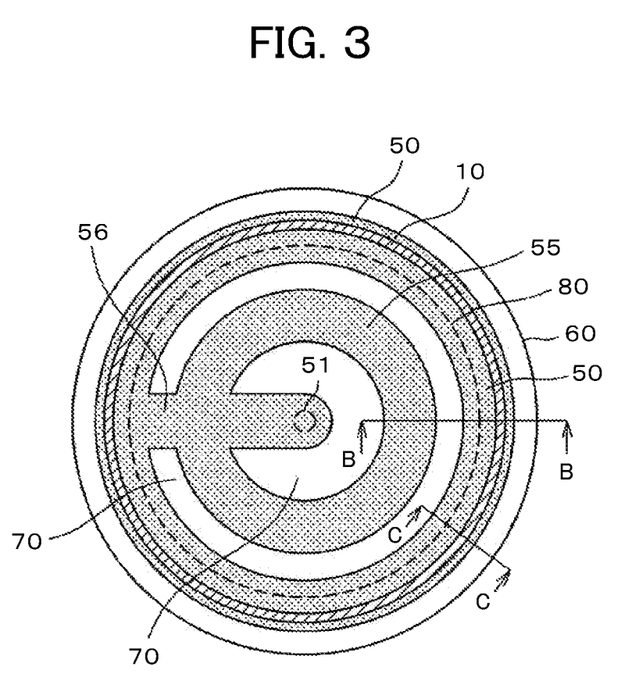
FIG. 3 is a plan view of a state before a hole portion is removed.

In the following, the configuration of the hole seal portion, which is a feature of the embodiment of the present invention, will be described. FIG. 3 is a plan view of the configuration of the hole seal portion in FIG. 1, before the hole portion is removed. In FIG. 3, the sealing material 50 and a dummy sealing material 55 are concentrically formed. A linear sealing material 56 connecting the sealing material 50 to the dummy sealing material 55 is provided for drawing the sealing material with a single stroke with a dispenser. A dotted circle in FIG. 3 is a mark indicating the start of drawing the sealing material with the dispenser.

A dotted circle 80 in the sealing material 50 in FIG. 3 is a cutting line. This portion is cut using a cutter with diamond abrasive grains, for example, to remove the circular portion. A feature is in that the cutting line 80 is present in the inside of the sealing material 50 for separating the TFT substrate 100 and the counter substrate 200 at the same time. The circular sealing material 55 on the inner side is provided for improving workability so that the materials on the end parts of the TFT substrate 100 and the counter substrate 200 are presented from falling apart.

In FIG. 3, the wall-like spacer 10 is formed in a circular shape on the display region 60 side of the cutting line 80. The wall-like spacer 10 is formed on the overcoat film 203 on the counter substrate 200 side. On the outer side of the wall-like spacer 10, the sealing material 50 is present. The region on the outer side of the sealing material 50 is the display region 60. The display region 60 is filled with the liquid crystal.

Figure 4:
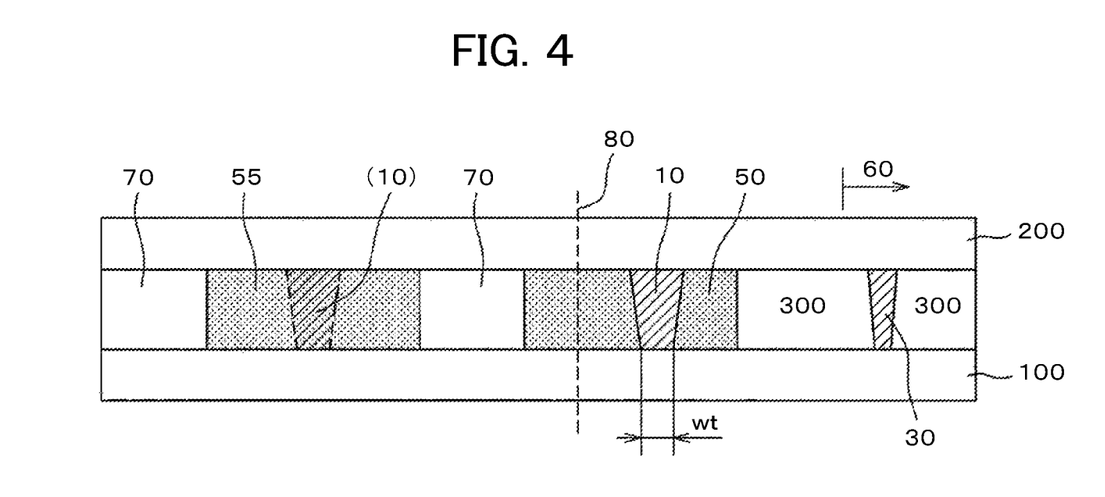
FIG. 4 is a cross-sectional view taken along line B-B in FIG. 3.

FIG. 4 is a cross-sectional view taken along line B-B in FIG. 3. In FIG. 4, the region on the right side of the cutting line 80 is a region to be left as the liquid crystal display panel. The region on the left side of the cutting line 80 is the hole portion 70 to be removed. As illustrated in FIG. 4, the cutting line 80 is present in the region in which the sealing material 50 is formed. In the inside of the sealing material 50 on the liquid crystal side of the cutting line 80, the wall-like spacer 10 is formed to define the gap between the TFT substrate 100 and the counter substrate 200 in the seal portion. The wall-like spacer 10 has a trapezoidal cross section. A width wt of the upper base is about 10 μm. As illustrated in FIG. 3, the wall-like spacer 10 is formed around with no break. The width of the sealing material 50 after the hole portion is formed is about 0.8 mm. Thus, a plurality of wall-like spacers 10 can be formed as necessary. A liquid crystal 300 is sealed on the display region 60 side of the sealing material 50. In the display region 60, the columnar spacer 30 is formed for defining the gap between the TFT substrate 100 and the counter substrate 200.

The region on the left side of the cutting line 80 is a dummy region. On the dummy region, the region between the sealing material 50 and the dummy sealing material 55 is a space. No spacers are necessary for the dummy sealing material 55. However, the wall-like spacer 10 may be formed as depicted by a dotted line so that the dummy sealing material does not affect the gap between the substrates in the display region. The region on the left side of the dummy sealing material 55 is again a space.

In a manufacturing method for the liquid crystal display device, the sealing material 50 for attaching the TFT substrate 100 to the counter substrate 200 is formed on the edge portion of the counter substrate 200, i.e., in the seal portion. After that, the liquid crystal is dropped in the reduced pressure. The TFT substrate 100 is attached to the counter substrate 200 in the reduced pressure, and then the substrates are returned in the atmospheric pressure. In this process, the sealing material, the columnar spacer, and the liquid crystal are compressed in the atmospheric pressure. As a result, the TFT substrate 100 and the counter substrate 200 are deformed. Depending on how to compress the sealing material, the columnar spacer, the liquid crystal, and other components at this time, the deformation of the substrates is varied. Thus, this causes a phenomenon in which the liquid crystal is entered between the sealing material 50 and the TFT substrate 100 or between the sealing material 50 and the counter substrate 200.

Figure 5A:
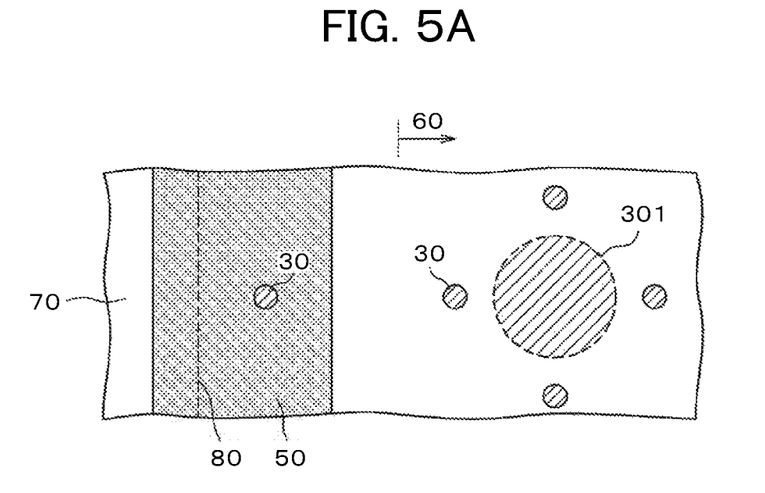
FIG. 5A is a plan view of a liquid crystal dropping process in the case in which the present invention is not used.
Figure 5B:
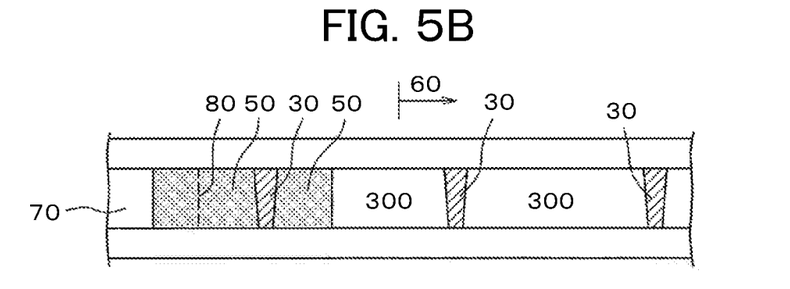
FIG. 5B is a cross-sectional view of a state in which a TFT substrate is attached to a counter substrate under a reduced pressure in the case in which the present invention is not used.
Figure 5C:
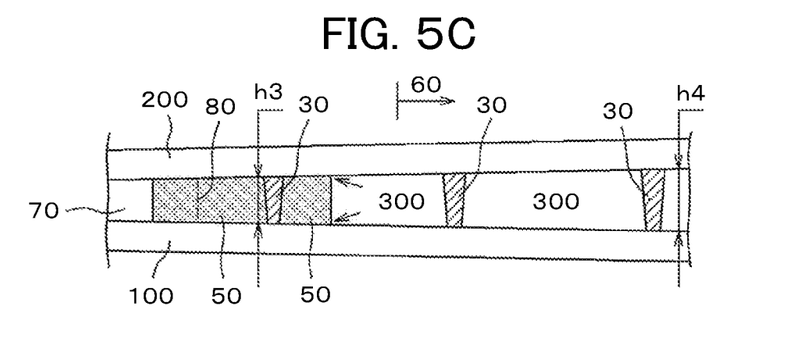
FIG. 5C is a cross-sectional view of a state of the TFT substrate and the counter substrate under an atmospheric pressure in the case in which the present invention is not used.

FIGS. 5A to 5C are schematic diagrams for explaining this problem. FIG. 5A is a plan view of the counter substrate 200 corresponding to the region near a cross section taken along line C-C in FIG. 3. In FIG. 5A, the cutting line 80 is present in the sealing material. Note that, the cutting line is not marked in the sealing material. In the inside of the sealing material 50, the columnar spacer 30 is formed for maintaining the gap between the TFT substrate 100 and the counter substrate 200 in the seal portion. The region on the left side of the sealing material 50 is the hole portion 70.

On the other hand, the region on the right side of the sealing material 50 is the display region 60. On the portion, the columnar spacer 30 is formed for defining the gap between the TFT substrate 100 and the counter substrate 200. A liquid crystal drop 301 is dropped onto the region on the display region 60 side of the sealing material 50 in the reduced pressure. After that, the TFT substrate 100 is attached to the counter substrate 200 in the reduced pressure. After the attachment, the liquid crystal drop 301 is spread over the entire display region 60. Note that, the liquid crystal drop 301 is dropped at a plurality of sites in the display region.

FIG. 5B is a cross-sectional view of the seal portion showing a state in which the TFT substrate 100 is attached to the counter substrate 200 in the reduced pressure. The gap between the counter substrate 200 and the TFT substrate 100 is maintained by the columnar spacer 30 in the display region and the columnar spacer 30 in the seal portion, and the gap between the TFT substrate 100 and the counter substrate 200 is constant. As described above, the reason why the attachment and dropping are performed in the reduced pressure is that no air is to be contained in the liquid crystal display panel.

FIG. 5C is a cross-sectional view of a region near the seal portion in the case in which the liquid crystal display panel in the state of FIG. 5B is returned in the atmosphere. When the panel is returned in the atmosphere, a pressure is applied to the TFT substrate 100 and the counter substrate 200. Since the liquid crystal 300 is filled in the display region 60, the gap between the TFT substrate 100 and the counter substrate 200 is not greatly changed. On the other hand, in the seal portion, the sealing material 50 is easily compressed by the atmosphere, because the volume of the sealing material 50 is small and the space is provided on the left side of the sealing material 50. Although the columnar spacer 30 is formed in the seal portion as well, the columnar spacer 30 does not have repulsion force enough to resist the atmospheric pressure.

When the sealing material 50 is compressed, in the cross section of the liquid crystal display panel, a gap h3 between the TFT substrate 100 and the counter substrate 200 in the seal portion is smaller than a gap h4 in the display region, resulting in a barrel cross section. When the cross section is a barrel cross section, a phenomenon occurs in which the liquid crystal 300 is entered to the interface between the sealing material 50 and the TFT substrate 100, or the interface between the sealing material 50 and the counter substrate 200. In FIG. 5C, arrows indicate this phenomenon. As described above, when the liquid crystal 300 is entered between the sealing material 50 and the substrates, the adhesive strength of the seal portion is decreased to degrade the reliability of the liquid crystal display panel. Moreover, the gap of the liquid crystal layer is affected near the sealing material, sometimes causing a degraded display quality.

Figure 6A:
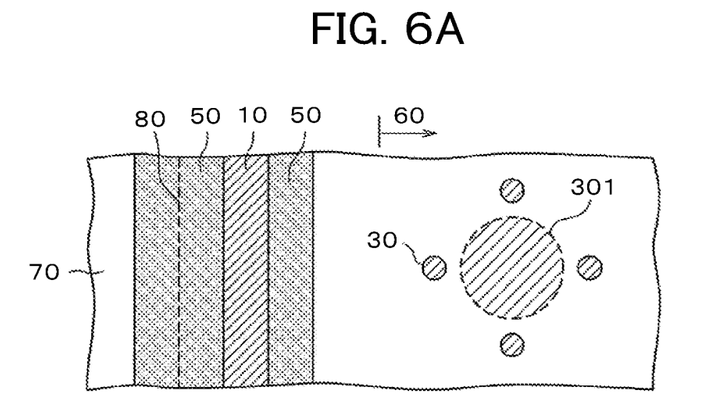
FIG. 6A is a plan view of a liquid crystal dropping process according to an embodiment of the present invention.
Figure 6B:
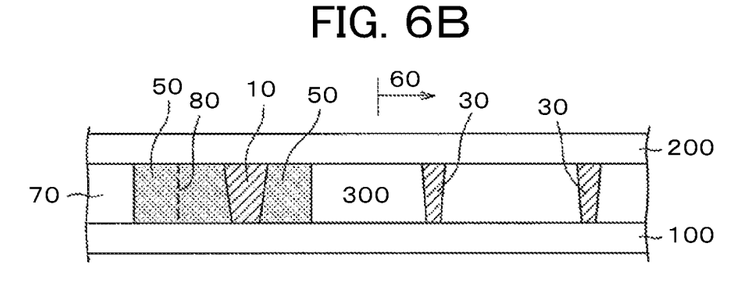
FIG. 6B is a cross-sectional view of a state in which a TFT substrate is attached to a counter substrate under a reduced pressure according to an embodiment of the present invention.
Figure 6C:
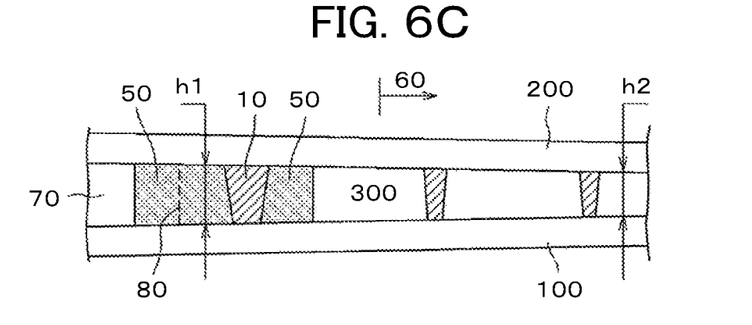
FIG. 6C is a cross-sectional view of a state of the TFT substrate and the counter substrate under an atmospheric pressure according to an embodiment of the present invention.

FIGS. 6A to 6C are diagrams for explaining measures for this problem according to the embodiment of the present invention. FIG. 6A is a plan view of the counter substrate 200 corresponding to a region near the cross section taken along line C-C in FIG. 3. The state in FIG. 6A is similar to the state in FIG. 5A except that the wall-like spacer 10 is present in the inside of the sealing material 50. The configuration in which the wall-like spacer 10 is present in the inside of the sealing material 50 is completely different from the configuration of the first seal portion on the outer edge of the liquid crystal display panel. Of course, a configuration like the configuration is not present in the display region as well.

FIG. 6B is a cross-sectional view of a state in which the TFT substrate 100 is attached to the counter substrate 200 in the reduced pressure. In FIG. 6B, the gap between the counter substrate 200 and the TFT substrate 100 is defined by the columnar spacer 30 in the display region 60, and the gap is defined by the wall-like spacer 10 in the seal portion. The other configurations in FIG. 6B are similar to ones described in FIG. 5B.

FIG. 6C is a cross-sectional view of a state in which the liquid crystal display panel illustrated in FIG. 6B is returned in the atmosphere. FIG. 6C is most different from FIG. 5C in that a gap h1 is maintained between the TFT substrate 100 and the counter substrate 200 in the seal portion with almost no influence of the atmospheric pressure on the gap. In other words, the wall-like spacer 10 is formed in the inside of the seal portion, and the strength of the wall-like spacer 10 against compression is much stronger than the strength of the columnar spacer 30.

On the other hand, in the display region 60, compressive stress is applied to the liquid crystal 300 by the atmospheric pressure. The columnar spacer 30 formed in the display region 60 has insufficient resistance to compressive force as well. Consequently, the cross-sectional topology of the liquid crystal display panel is a so-called deformed bobbin in which the gap h2 between the TFT substrate 100 and the counter substrate 200 in the display region 60 is smaller than the gap h1 in the seal portion.

In the case of this deformed bobbin, in the portion near the seal portion, the gap h1 in the reduced pressure, which is the original gap, is maintained between the TFT substrate 100 and the counter substrate 200. Thus, as a whole, the volume of accommodating the liquid crystal is greater than the volume in FIG. 5C, and the force of entering the liquid crystal to the interface between the sealing material 50 and the TFT substrate 100, or the interface between the sealing material 50 and the counter substrate 200 is smaller than the force illustrated in FIG. 5.

The compressive force of the atmospheric pressure applied to the sealing material 50 also has a distribution in which the liquid crystal 300 is not easily entered between the sealing material 50 and the substrates. In other words, a pressure to compress-bond the substrates and the sealing material 50 is generated. Accordingly, a defect, in which the liquid crystal 300 is entered to the interface between the sealing material 50 and the TFT substrate 100 or the interface between the sealing material 50 and the counter substrate 200, can be avoided. As described above, with the use of the embodiment of the present invention, the adhesive strength of the seal portion can be stably maintained, and the reliability of the liquid crystal display panel can be secured.

Another merit of according to the embodiment of the present invention is that the cross section of the liquid crystal display panel is a bobbin shape, i.e., the TFT substrate 100 or the counter substrate 200 is projected on the inner side. When this shape is formed, variations in the gap between the substrates of the liquid crystal display panel can be made smaller in the case in which a pressure is externally applied. In other words, the substrates are already deformed in the direction the same as the direction in which a pressure is externally applied to the substrates. Thus, even though an external pressure is applied, the substrates are already in the state in which they are hardly further deformed. This is a great advantage in the case in which a touch panel function is imparted to the liquid crystal display panel, this.

Figure 7:
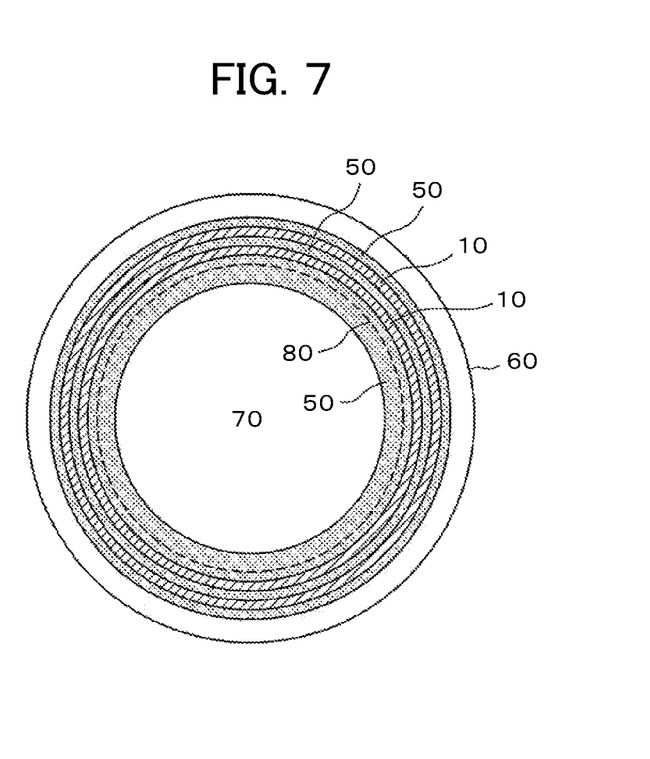
FIG. 7 is a plan view of a region near a hole portion according to another embodiment of the present invention.

The width wf of the sealing material 50 is about 0.8 mm, whereas the width of the wall-like spacer 10 is about 10 μm. Thus, a plurality of wall-like spacers 10 can be disposed in the inside of the sealing material 50. FIG. 7 shows this example. FIG. 7 is a plan view illustrating only a portion corresponding to the sealing material 50 in FIG. 3. In FIG. 7, the region on the inner side of the dotted cutting line 80 in the inside of the sealing material 50 is a portion removed with a glass cutter, for example.

Two wall-like spacers 10 are concentrically formed in the inside of the sealing material 50 on the display region 60 side of the cutting line 80. The sealing material 50 is present between the two wall-like spacers 10. The sealing material 50 is present on both sides of the two wall-like spacers 10. The two wall-like spacers 10 are present. Thus, the gap in the seal portion can be more stably maintained, and the phenomenon, in which the liquid crystal is entered between the sealing material and the counter substrate or between the sealing material and the TFT substrate, can be prevented.

The number of sites, on which the wall-like spacer is provided, may be three or more as necessary. The wall-like spacer can be simultaneously formed by the same process of photolithography with the same material when the columnar spacer is formed in the display region 60. Thus, no process load is increased even though a plurality of wall-like spacers 10 is formed.

In the forming process of the seal portion, the wall-like spacer 10 is formed in advance in the seal portion of the counter substrate 200 by photolithography, and the sealing material 50 is disposed in the seal portion covering the wall-like spacer 10 with a dispenser. The liquid crystal is dropped onto the region on the display region 60 side of the sealing material 50. After that, the TFT substrate 100 is attached to the counter substrate 200. At this time, the sealing material 50 is pressed by the TFT substrate 100, and spread in a predetermined width. In the spreading, the sealing material 50 is excluded from between the wall-like spacer 10 and the TFT substrate 100.

However, in some cases, the sealing material 50 is not completely removed from between the wall-like spacer 10 and the TFT substrate 100, and the sealing material 50 is sometimes left. The sealing material left between the wall-like spacer 10 and the TFT substrate 100 is a factor to vary the gap between the counter substrate 200 and the TFT substrate 100. Therefore, in order to stably maintain the gap between the TFT substrate 100 and the counter substrate 200, no sealing material 50 is preferably left between the wall-like spacer 10 and the TFT substrate 100.

Figure 8:
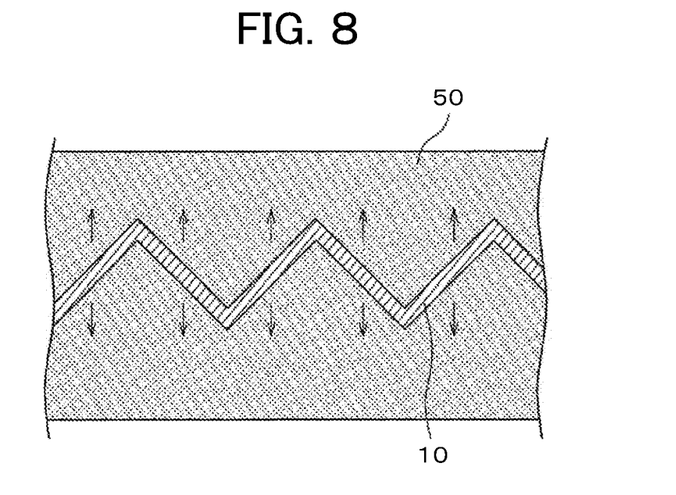
FIG. 8 is a plan view of another embodiment of the shape of a wall-like spacer.

FIG. 8 is a plan view of an example of the wall-like spacer 10 cooping with this problem. FIG. 8 shows an example in which the planar shape of the wall-like spacer 10 is formed being bent in a saw shape. The wall-like spacer 10 may be bent in a wave shape. The sealing material 50 is formed covering the wall-like spacer 10 formed in the seal portion of the counter substrate 200 with a dispenser, and then the TFT substrate 100 is attached. The sealing material 50 is pressed by the TFT substrate 100, and the sealing material 50 is removed from between the wall-like spacer 10 and the TFT substrate 100. When the wall-like spacer 10 is formed in the shape as in FIG. 8, oblique force is applied to the sealing material 50, and the sealing material 50 is easily moved between the wall-like spacer 10 and the TFT substrate 100 as depicted by arrows in FIG. 8. Accordingly, when the wall-like spacer 10 is formed in the shape as in FIG. 8, the gap between the TFT substrate 100 and the counter substrate 200 in the seal portion can be further stabilized.

Moreover, in the wall-like spacer 10 as in FIG. 8, since the area of the wall-like spacer 10 in a planner view is increased, the wall-like spacer 10 as in FIG. 8 also has an effect that can further increase the compressive stress of the wall-like spacer 10. Accordingly, the gap between the TFT substrate 100 and the counter substrate 200 in the seal portion can be further stabilized.

As illustrated in FIG. 3, the sealing material 50 has to be present on both sides of the wall-like spacer 10, and the sealing material 50 has to be present also on both sides of the cutting line 80. This means that when viewed in the cross section taken along line C-C in FIG. 3, the position of the wall-like spacer 10 is often not matched with the center of the sealing material 50. In the case in which the sealing material 50 in a large amount is formed on one side of the wall-like spacer 10, the sealing material 50 insufficiently flows to the other side of the wall-like spacer 10 even though the sealing material 50 is pressed by the TFT substrate 100. This causes the width of the sealing material to be unstable, resulting in a degraded reliability of the seal portion.

Figure 9:
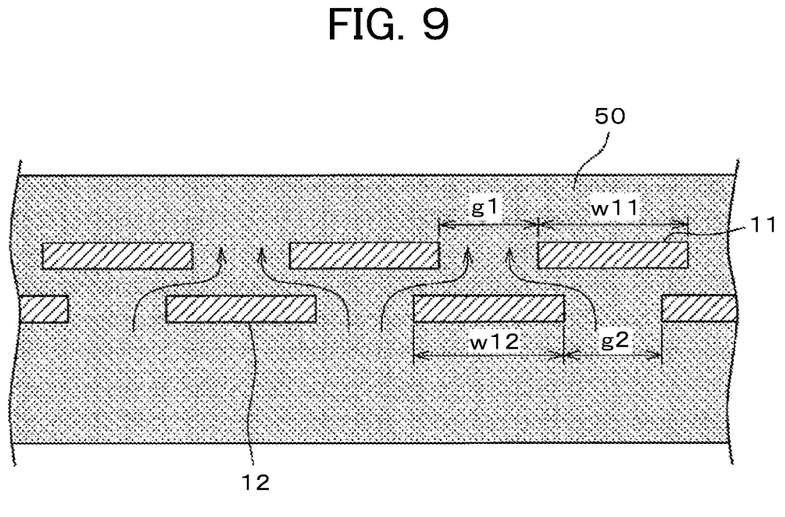
FIG. 9 is a plan view of still another embodiment of the shape of the wall-like spacer.

FIG. 9 is a plan view of the wall-like spacer 10 cooping with this problem. In FIG. 9, a first wall-like spacer 11 is non-consecutively formed at a first gap g1, and a second wall-like spacer 12 is non-consecutively formed at a second gap g2. Supposing that even in the case in which the sealing material 50 formed with a dispenser is formed in a large amount on one side of the wall-like spacers 11 and 12, the sealing material 50 can flow through the gap between the wall-like spacers when pressed. Accordingly, the width of the sealing material 50 can be further stably formed.

In FIG. 9, a width w11 of the first wall-like spacer 11 is the same as a width w12 of the second wall-like spacer 12, and the gap g1 between the first wall-like spacers 11 is the same as the gap g2 between the second wall-like spacers 12, which are w11>g1 and w12>g2. However, any dimensions are possible. Dimensions may be determined by taking into account of the elastic force (repulsion force) of the wall-like spacer and the flowability of the sealing material.

In FIG. 9, the wall-like spacers are formed in two rows. However, the wall-like spacers may be formed in one row. Also in this case, the width of the wall-like spacer is preferably greater than the gap between the wall-like spacers. For example, w11>g1 is desirable. In FIG. 9, the wall-like spacers are formed in two rows. However, the wall-like spacer can be formed in three rows or more.

Figure 10:
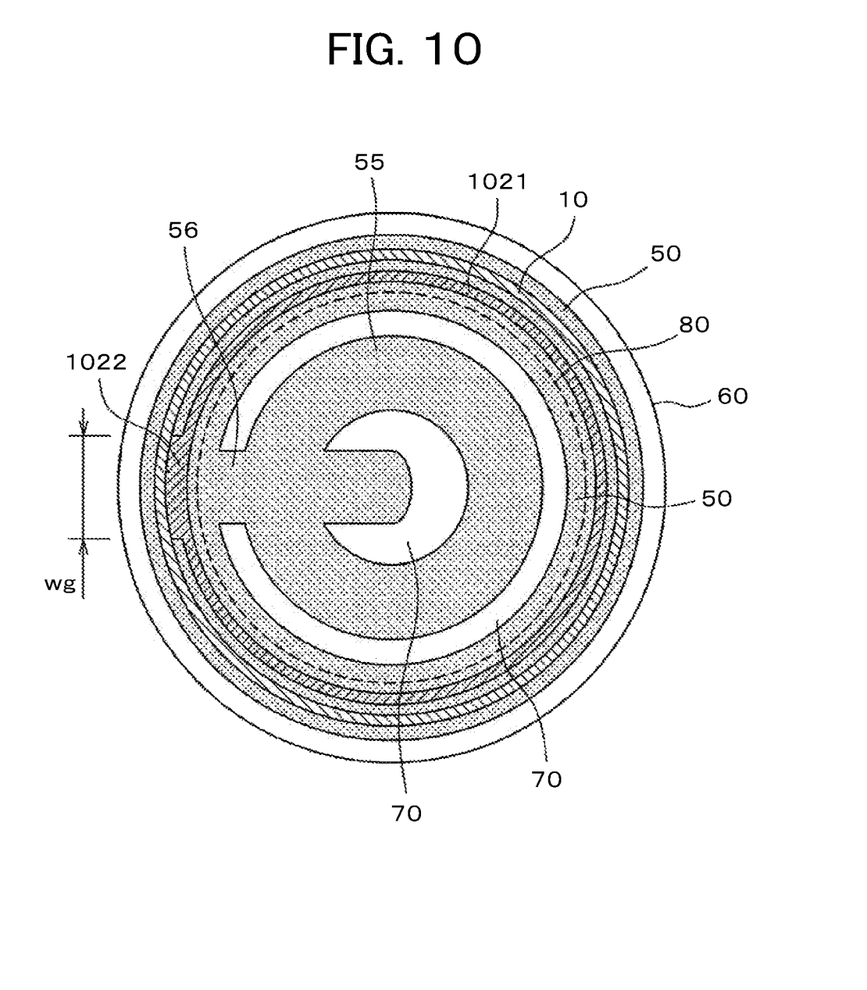
FIG. 10 is a plan view of an exemplary shape of a groove of an organic passivation film of a hole seal portion.

FIG. 10 is a plan view of still another embodiment of a hole seal portion before the hole portion is formed. In FIG. 10, the sealing material 50 and the wall-like spacer 10 are similar to ones in FIG. 3. FIG. 10 is different from FIG. 3 in that the groove 1021 of the organic passivation film 102 in FIG. 2 is illustrated in FIG. 10. The embodiment illustrated in FIG. 10 is characterized in that the width of a widened groove 1222 of the organic passivation film 102 is wider than the width of the other portions in a portion corresponding to a connecting portion 56 connecting the sealing material 50 to the dummy sealing material 55 in drawing the sealing material 50 with a single stroke.

In drawing the sealing material with a single stroke, the amount of the sealing material 50 is increased on a portion where the sealing materials 50 are overlapped with each other, causing the width of the sealing material 50 to be irregular on the portion. In FIG. 10, in order to prevent this problem, the width of the groove 1021 of the organic passivation film 102 is increased on the portion where the sealing materials 50 are overlapped with each other, accommodating an excess amount of the sealing material 50 in the widened groove 1222 of the organic passivation film 102. Thus, the width of the sealing material 50 can be stabilized.

The width of the widened groove 1222 of the organic passivation film is typically about 100 µm. However, in FIG. 10, the width of the widened groove 1222 of the organic passivation film 102, which is widened in the groove 1021 is about 200 µm. In FIG. 10, a forming region wg, in which the widened groove 1021 of the organic passivation film 102 is formed, has a width almost the same as the width of the sealing material, which is about 0.8 mm. The organic passivation film 102 is formed to have a thickness as thick as a thickness of 2 to 4 µm. Thus, the volume of accommodating the sealing material 50 in the portion of the widened groove 1222 of the organic passivation film 102 is considerably large. Note that, the width and forming region of the groove 1021 of the organic passivation film 102 only have to be adjusted being matched with the width, amount, and other parameters of the sealing material to be drawn with a single stroke.

Figure 11:
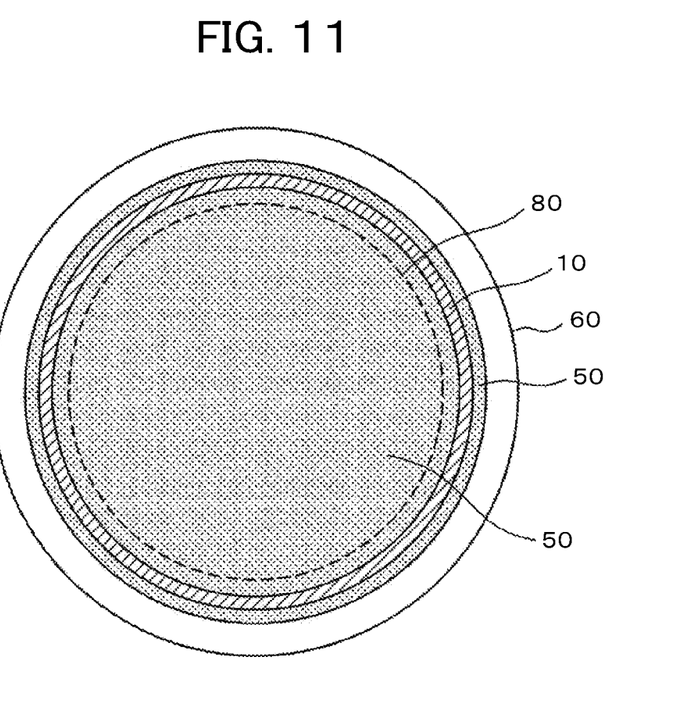
FIG. 11 is a plan view of another example of a shape before a hole portion is formed.

FIG. 11 is a plan view of still another embodiment of the hole seal portion. FIG. 11 is different from FIG. 3 in that the sealing material 50 is also formed in the dummy region continuously to the seal portion. In other words, in FIG. 11, the sealing material 50 is formed in a disk shape. The sealing material 50 in this shape can be formed by printing, for example. The sealing material 50 is formed in the shape as illustrated in FIG. 11. Thus, the seal portion can be uniformly formed in the entire hole portion. In FIG. 11, the region on the display region 60 side of the cutting line 80 is similar to the region in FIG. 3, and the description is omitted.

Figure 12:
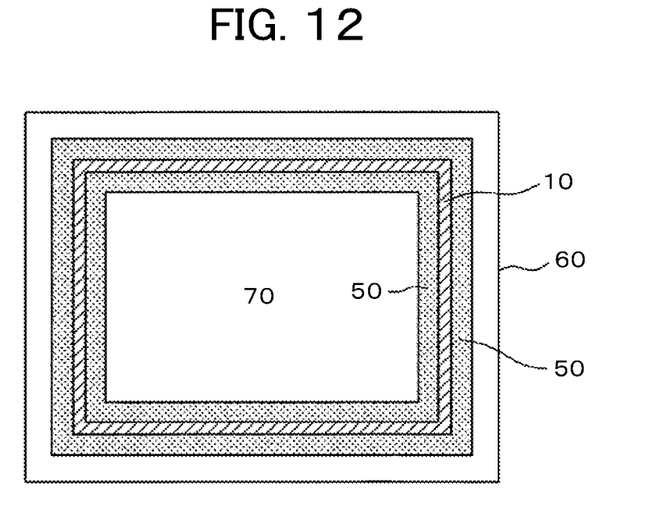
FIG. 12 is a plan view of an example of a rectangular hole portion.

In FIGS. 1 to 11, the hole portion 70 is described to have a circular shape. However, the content described in FIGS. 1 to 11 is also applicable to the case in which the hole portion is in a polygon, not a circular shape, for example, which is a rectangular hole 70 as illustrated in FIG. 12. FIG. 12 is a plan view of a hole seal portion after the dummy sealing material is cut. In FIG. 12, the sealing material 50 is present at the end portion of the second seal portion so as to surround the hole seal portion. In the inside of the sealing material 50, the wall-like spacer 10 is formed around with no break. For the cross-sectional topology and other configurations of the hole seal portion, the configurations described in FIGS. 1 to 10 can be similarly used.

In the description above, the wall-like spacer is formed on the counter substrate side. However, the wall-like spacer may be formed on the TFT substrate side. In this case, taking into account of process loads, the columnar spacer is also desirably formed on the TFT substrate side. A configuration with no bank-like spacer 20 may be possible. In this case, a configuration may be possible in which the sealing material is provided to be terminated on the inner side of the end portion of the substrate, or a configuration may be possible in which the sealing material is left in the scribed region.

In the description above, as illustrated in FIG. 2, for example, the description is made on the premise of an In-Plane Switching (IPS) liquid crystal display device. However, the embodiment of the present invention is also applicable to liquid crystal display devices in other modes, such as twisted nematic (TN) and vertical alignment (VA) liquid crystal display devices.

What is claimed is:

1. A liquid crystal display device comprising:
a first substrate;
a second substrate;
an organic film on the first substrate; and
a liquid crystal sandwiched between the first and the second substrates,
wherein:
each of the first substrate and the second substrate includes a penetrated portion;
the first substrate and the second substrate are fixed by a first sealing material which is formed in a first seal portion and a second sealing material which is formed in a second seal portion;
the first seal portion is in an outer area of a display region;
the second seal portion is between the penetrated portion and the display region;
the second seal portion has a first end portion on the liquid crystal side and a second end portion on the penetrated portion wherein the first end portion extends along an outer circumference of the second seal portion, and the second end portion extends along an inner circumference of the second seal portion;
a spacer is formed between the first end portion and the second end portion, and the spacer defines a gap between the first and the second substrates;
the spacer continuously extends along an entire edge of the penetrated portion;
a columnar spacer is formed in the first seal portion;
a width of an upper base of a trapezoidal cross section of the columnar spacer is smaller than a width of an upper base of a trapezoidal cross section of the spacer, and
a groove in the organic film is formed between the spacer and the second end portion.

2. The liquid crystal display device according to claim 1, wherein the spacer is bent in a planar view.

3. The liquid crystal display device according to claim 1, wherein the spacer is bent in a wave shape in a planar view.

4. The liquid crystal display device according to claim 1, wherein a plurality of the spacers are formed between the first end portion and the second end portion in a cross section of the second seal portion.

5. The liquid crystal display device according to claim 1, wherein the penetrated portion is in a circular shape in a planar view.

6. The liquid crystal display device according to claim 1, wherein the penetrated portion is in a polygon shape in a planar view.

7. The liquid crystal display device according to claim 1, wherein: the first seal portion has a third end portion on the liquid crystal side and a fourth end portion on an opposite side of the liquid crystal side;
the first sealing material is in the third end portion; and
a bank-like spacer is in the fourth end portion.

8. The liquid crystal display device according to claim 1, wherein the first substrate has a first edge and the second substrate has a second edge, the first edge and the second edge form the penetrated portion, and the second sealing material is disposed between the first edge and the second edge.

9. The liquid crystal display device according to claim 1, wherein the spacer in the second seal portion has a shape which is substantially same as the shape of the edge of the penetrated portion.

10. A liquid crystal display device comprising:
a first substrate;
a second substrate;
an organic film on the first substrate; and
a liquid crystal sandwiched between the first and the second substrates,
wherein:
each of the first substrate and the second substrate includes a penetrated portion;
the first substrate and the second substrate are fixed by a first sealing material which is formed in a first seal portion and a second sealing material which is formed in a second seal portion;
the first seal portion is in an outer area of a display region;
the second seal portion is between the penetrated portion and the display region;
a spacer is formed in the second sealing material, and defines a gap between the first and the second substrates;
the spacer continuously extends along an entire edge of the penetrated portion, or the spacer is divided into sub-spacers, the sub-spacers surround the entire edge of the penetrated portion;
a columnar spacer is formed in the first seal portion;
a width of an upper base of a trapezoidal cross section of the columnar spacer is smaller than a width of an upper base of a trapezoidal cross section of the spacer, and
a groove in the organic film is formed between the spacer and the penetrated portion.

11. The liquid crystal display device according to claim 10, wherein the spacer in the second seal portion has a shape which is substantially same as the shape of the edge of the penetrated portion.

12. The liquid crystal display device according to claim 10, wherein the spacer is bent in a planar view.

13. The liquid crystal display device according to claim 10, wherein the first substrate has a first edge and the second substrate has a second edge, the first edge and the second edge form the penetrated portion, and the second sealing material is disposed between the first edge and the second edge.

14. The liquid crystal display device according to claim 10, wherein a plurality of the spacers are formed in the second sealing material in a cross section of the sealing material.

15. A liquid crystal display device comprising:
a first substrate;
a second substrate;
an organic film on the first substrate; and
a liquid crystal sandwiched between the first and the second substrates, wherein:

each of the first substrate and the second substrate includes a penetrated portion;

the first substrate and the second substrate are fixed by a first sealing material which is formed in a first seal portion and a second sealing material which is formed in a second seal portion;

the first seal portion is in an outer area of a display region;

the second seal portion is between the penetrated portion and the display region;

the second seal portion has a first end portion on the liquid crystal side and a second end portion on the penetrated portion wherein the first end portion extends along an outer circumference of the second seal portion, and the second end portion extends along an inner circumference of the second seal portion;

a spacer is formed between the first end portion and the second end portion, and the spacer defines a gap between the first and the second substrates;

the spacer is divided into sub-spacers, the sub-spacers surround the entire edge of the penetrated portion;

a columnar spacer is formed in the first seal portion;

a width of an upper base of a trapezoidal cross section of the columnar spacer is smaller than a width of an upper base of a trapezoidal cross section of the spacer, and a groove in the organic film is formed between the spacer and the second end portion.

* * * * *